(12) United States Patent
Mansour-Awad (10) Patent No.: US 6,862,488 B2
(45) Date of Patent: Mar. 1, 2005

(54) AUTOMATED VALIDATION PROCESSING AND WORKFLOW MANAGEMENT

(75) Inventor: Amany Mansour-Awad, New York, NY (US)

(73) Assignee: Validation Commerce, LLC, Philadelphia, PA (US)

(*) Notice: Subject to any disclaimer, the term of this patent is extended or adjusted under 35 U.S.C. 154(b) by 278 days.

(21) Appl. No.: 10/190,368

(22) Filed: Jul. 5, 2002

(65) Prior Publication Data

US 2004/0006403 A1 Jan. 8, 2004

(51) Int. Cl.$^7$ ............................................. G06F 19/00
(52) U.S. Cl. ..................... 700/97; 700/109; 700/103; 705/1
(58) Field of Search ............................ 700/97, 90, 95, 700/103, 108, 109; 702/81, 84, 104; 707/104.1, 102; 709/201; 705/1, 7–9; 345/764

(56) References Cited

U.S. PATENT DOCUMENTS

| 6,456,955 | B1 | 9/2002 | Andrews et al. | |
| 2003/0069894 | A1 * | 4/2003 | Cotter et al. | 707/104.1 |
| 2004/0158475 | A1 | 8/2004 | Juzeszyn et al. | |

OTHER PUBLICATIONS

Agalloco et al. "Master,planning and validation: Part 2: System definition" Biopharm; Apr. 2000,vol. 13, No. 4, pp. 34–38.*

Hodgson, "A pratical guide to executing validation protocols", Biopharm; Apr. 1999,vol. 12, No. 4, pp. 30–32.*

Budihandojo et al. "The future state of computer validation, Part II: Increasing the efficiency of computer validation pratices" Pharmaceutical Technology Europe; Jan. 2002, vol. 14, No. 1, pp. 34–40.*

* cited by examiner

*Primary Examiner*—Leo Picard
*Assistant Examiner*—Steven R. Garland (57) ABSTRACT

A system and methods to perform automated validation and corresponding workflow management are provided. In an illustrative implementation, the present invention comprises a computing application operating in a computing environment that cooperates with at least one data store. The computing application provides a user interface to accept and display data representative of validation processing and/or the corresponding workflow management surrounding the validation lifecycle. In operation, data is accepted through the user interface and processed by the exemplary computing application to generate one or more validation protocols. Further, validation protocols are stored in cooperating data stores for subsequent execution. The exemplary computing application also maintains processing rules that allow participating users to perform workflow management for efforts required to realize the validation lifecycle.

23 Claims, 9 Drawing Sheets

Figure 1

PRIOR ART

AUTOMATED VALIDATION PROCESSING AND WORKFLOW MANAGEMENT

FIELD OF THE INVENTION

The present invention relates to a system and methods for automating validation efforts. More particularly, a system and methods that allow for the automation of the validation lifecycle surrounding validation of processes and equipment used in manufacturing.

BACKGROUND

Administrative agencies, world wide, have promulgated rules and regulations for the manufacture of pharmaceutical and biotechnology products. These rules and regulations, inter alia, stipulate that Pharmaceutical and Biotech companies are required to "validate" their products, processes, and equipment used in the manufacture of a drug (or other related product—e.g. raw materials) in order to obtain a manufacturing license. In short, validation is a process that evidences to the administrative agencies that the pharma/biotech (i.e. the pharma/biotech companies seeking manufacturing licenses) companies' facilities and equipment consistently produce products that meet predetermined quality and safety standards.

Validation efforts are often arduous and expensive. In a typical validation life cycle, the equipment, facility, and/or process is first identified. The equipment, facility, and/or process is then described in accordance with validation guidelines to generate a validation protocol. The validation protocol, inter alia, describes the equipment, facility, and/or process that is being validated along with one or more tests that will be applied to the equipment, facility, and/or process that will ensure that the equipment, facility, and/or process satisfy predetermined quality and safety standards. The level of detail required in a typical validation protocol can be mind-numbing. It is not hard to imagine that such efforts are both time and labor intensive. Moreover, there is additional significant time and labor expended in managing the workflow between validation personnel and project personnel (e.g. project managers, engineers, etc.) in the validation life cycle. Specifically, validation personnel must constantly communicate with project personnel to ensure that the validation protocols being prepared and executed are accurate and complete. The validation industry as a whole are late adopters of technology, however, often relying on traditional and conventional communication media, such as person-to-person conferences, teleconferences, postal mail, facsimile, and for the lofty, e-mail which often contributes to delays in completing validation and contributes to the loss of data between cooperating parties of a validation effort.

Currently, pharma/biotech companies have few options when performing validation. They may undertake the expensive task of maintaining an in-house validation department having personnel dedicated to performing the validation life cycle. Alternatively, many companies may outsource validation efforts to validation consulting companies. The validation consulting companies have validation personnel (e.g. validation engineers, validation project managers, etc.) that maintain expertise in performing validation for pharma/biotech companies. Although, cheaper than maintaining a full validation department, outsourcing validation efforts is not inexpensive. Knowing the critical nature of validation, validation consulting companies also are not shy in charging a premium to perform validation services. However, often times, the services provided by validation personnel are not unique. That is, validation consultants are often guilty of reworking existing validation protocols to meet new project specifications and leveraging boiler-plate validation protocols. Such practice results in significant margins for validation consultants and significant expense to pharma/bio-tech companies.

Some efforts have been made to reduce the costs of validation life cycle by improving workflow management. Included, is the development of workflow management software that helps pharma/bio-tech companies better track and monitor validation efforts. Such software is typically geared towards managerial efforts and does not contribute to the creation and/or deployment of validation protocols; validation protocols that are at the heart of the validation life cycle. Even with the deployment of such workflow management software, the validation life cycle can still be extremely burdensome as valuable and expensive time and labor is dedicated to the creation and deployment of validation protocols. Further, current workflow management software, although helpful in monitoring validation workflow, does not allow for centralized storage and access of the validation protocols. Moreover, current workflow management software does not facilitate communication between the parties of the validation life cycle (e.g. pharma/bio-tech project personnel and management, validation personnel, etc.); vital communication that may be critical to the efficient and successful creation and deployment of validation protocols.

In addition to the development of workflow management software, there have been some attempts to incorporate some of the validation reporting requirements in project management software. Such software allows pharma/bio-tech companies to integrate the results of validation protocol deployment into project plans and reports. However, akin to the workflow management software, the project management software does not provide functionality that assists companies to create, manage, store, track, and test the all important validation protocols.

From the foregoing it can be appreciated that there exists a need for comprehensive systems and methods that overcome the shortcomings of existing practices.

SUMMARY

Systems and methods are provided that allow for automation of the validation life cycle and corresponding/surrounding workflow management. In an illustrative implementation, the systems and methods described herein comprise a computing platform operating at least one computing application having processing rules to perform automation of the validation life cycle and surrounding/corresponding workflow management. In the implementation, provided, the computing application may cooperate with one or more data stores containing data indicative of validation life cycle information its surrounding workflow management to realize automated validation efforts. Further, the illustrative computing application comprises a user interface to accept and display validation life cycle and/or workflow management data.

In operation, a participating user interacts with the illustrative computing application to request or input data indicative of one or more parts of the validation life cycle and/or workflow management surrounding the validation life cycle. The computing application processes the interaction according to pre-defined processing rules and cooperates with one or more data stores to satisfy received requests. The processing rules of the illustrative computing application provide a basis for automating the many manual tasks involved when performing one ore more parts of the validation life cycle and/or its workflow management. These processing rules are dynamic and adaptive such that they may be customizable to address various specialized needs surrounding the validation life cycle and its surrounding workflow management, and furthermore, may be self-learning such the processing rules modify themselves based on user inputs.

Other features of the present invention are described below.

BRIEF DESCRIPTION OF THE DRAWING

The system and methods providing automation of the validation life cycle and its surrounding workflow management are further described with reference to the accompanying drawings in which.

DETAILED DESCRIPTION OF ILLUSTRATIVE IMPLEMENTATION

Overview:

Currently, pharmaceutical and biotech companies are required to complete validation processes before the FDA can license them to manufacture a drug. Validation provides the drug company with documented evidence that its facilities and equipment consistently produce products that meet predetermined quality requirements. Generally speaking, validation has two principal elements. The first is the creation of a protocol; a protocol in this context may be taken to mean a sequence of tests designed to verify steps of drug/bio-tech product testing and manufacturing processes and critical functions of equipment used in the production/testing/manufacturing processes. The second is the execution of the protocol. After the validation protocol is created and approved, it is executed on the equipment and the processes used to make the desired products to validate them. Currently, validation personnel usually create protocols, perform the tests and prepare summary reports of the observed results. Once created, these protocols are stored for future use. Interestingly enough, the stored protocols are often recycled by validation personnel for use in subsequent pharma/biotech manufacturing projects as these projects will often use similar product production/testing/manufacturing processes and equipment. As a result, under current practices, unknowing pharma/biotech companies often pay validation contractors for protocols that the contractors state to have created from scratch, but in reality have created or recycled using "boilerplate" protocol language that is extracted from similarly previously executed protocols.

Along the pharma/biotech project continuum, validation tends to fall towards the end of the timeline for facility and/or production line development. To this end, companies will most often underestimate the time needed to complete the validation life cycle as problems with the equipment and/or the facility are usually not detected until the validation processes are performed. Such practice is, however, at odds with the primary goal for these pharma/biotech companies—to complete the validation process in a time efficient manner so as not to delay bringing manufactured products to market. Simply put, the quicker the validation life cycle can be completed, the faster that drugs can be manufactured and ultimately delivered to market.

Each drug manufacturer approaches validation differently. Validation personnel usually report to an organization's engineering, quality assurance and/or operations departments. Until recently, the validation of a new pharma/biotech production/testing/manufacturing facility was performed and managed by either an outside engineering and construction firm or an independent validation firm. However, drug manufacturers, now, have not only developed in-house expertise in validation, but also have realized the advantages of managing these projects themselves. As a result, drug manufacturers are no longer contracting with a validation/engineering firms to provide turnkey validation services (planning, managing and executing validation projects); instead, they may only contract out segments of the work such as the creation or execution of protocols. As a whole, he industry is looking for alternatives to control costs and time expenditures associated with validation and more particularly with the creation, management, and implementation of the all important validation protocols.

Validation Protocols

There are three types of protocols that are generally employed when performing validation: the Installation Qualification (IQ) protocol, the Operational Qualification (OQ) protocol, and the Performance Qualification (PQ) protocol. The IQ protocol is used to ensure that the equipment is installed correctly to meet the drug manufacturer's specifications. The OQ protocol provides assurance that the equipment operates in line with the drug manufacturer's specifications. Lastly, the PQ protocol is used to verify that the manufacturing equipment operates properly when used with other cooperating manufacturing equipment.

Depending on the size and complexity of a new facility (or new processes in an existing facility), in an average drug manufacturing facility, a drug manufacturer may need to validate approximately 100 to 200 pieces of equipment. For each piece of equipment an IQ protocol, OQ protocol, and PQ protocol needs to be created, verified, and tested. Therefore, in an average drug manufacturing facility approximately 300 to 600 protocols may be required to be generated, managed, and implemented. Such task is extremely time and labor intensive if left to manual processing alone.

Current Validation Process

Figure 1:
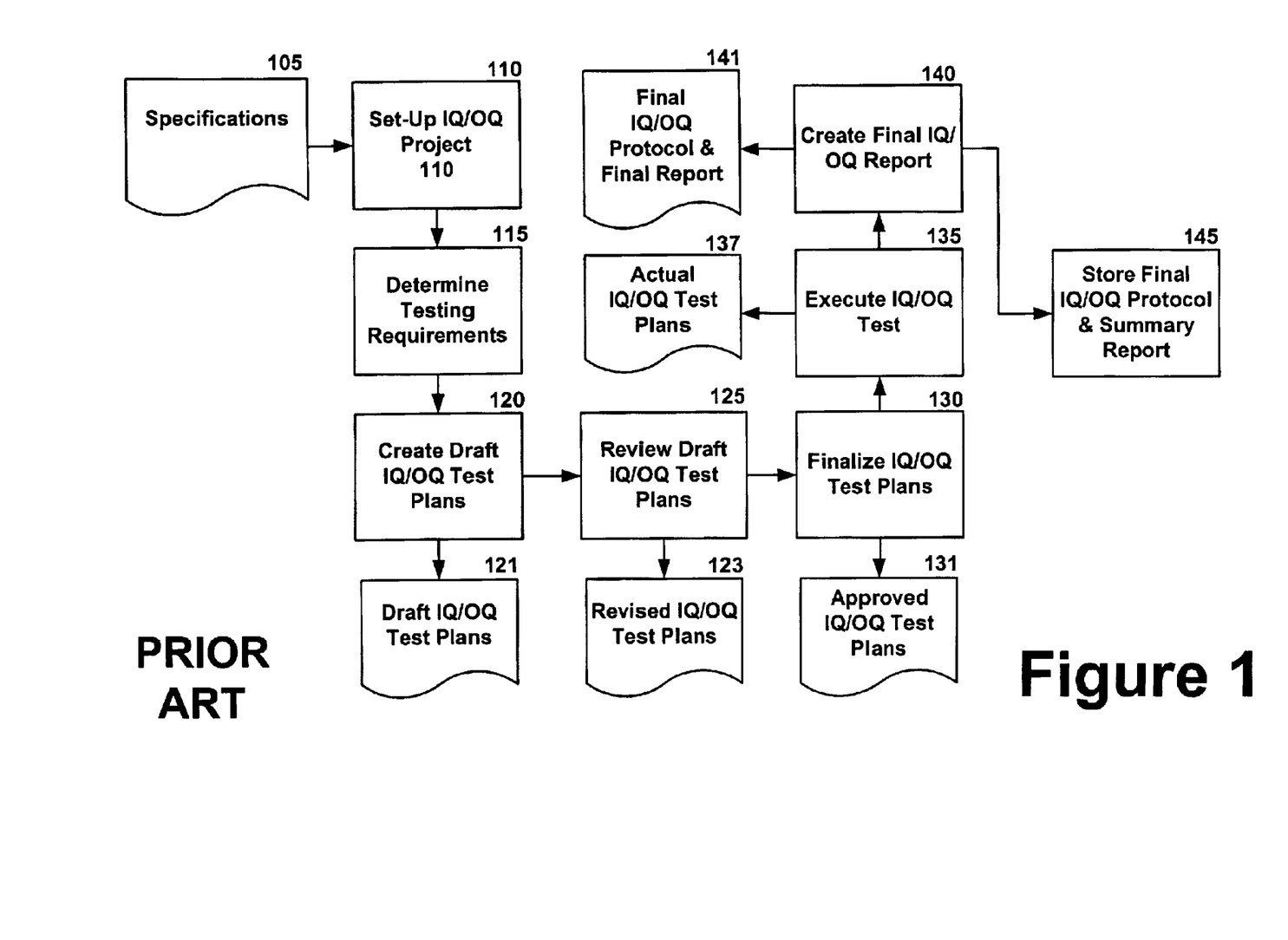
FIG. 1 is a flow diagram of the processing flow of current validation practices.

FIG. 1 describes currently practiced validation processes, that as shown, are heavily dependent on manual labor and that require significant time expenditure. To date, most organizations have not invested in technology to improve these validation processes. For example, a complex protocol (such as a HVAC qualification protocol) can take up to three weeks to create and approve; on average, 30–40% of the time expended is spent developing a draft protocol, while 20–30% of the time is spent reviewing and obtaining approval for the protocol. The remaining time is spent gathering specifications and executing the protocol. The present invention provides at least one means to drastically reduce these inefficiencies. The present invention provides, inter alia, an automated validation processing system that allows automated protocol creation and generation, that provides a content management system to manage and store protocol components, and that provides a workflow system that manages and chronicles protocol execution.

As shown in FIG. 1, the prior art validation process begins at block 105 where specifications (e.g. operational specifications, physical equipment specifications, tolerances, etc.) for various equipment and/or processes to be used in a desired product manufacturing process(es) are generated by project engineers and communicated to validation personnel (e.g. outsourced validation personnel) by the project manager. The specification information is communicated through conventional communication means including postal mail, courier, facsimile, and, for the technology prone, through e-mail. A result of such practice is the decentralized storage of validation data amongst the participating parties that contribute to the realization the validation life-cycle. The decentralized storage of data can contribute versioning errors resulting from multiple parties maintaining one or more version of validation data and, most importantly, contributes to a loss data control and management.

Once the specifications are determined, the equipment project IQ/OQ protocols are created based on the specification data by validation personnel at block 110. This set-up step entails reviewing the specification data to determine which equipment(s) and processes will require validation and generating one ore more validation protocols for execution. From there, testing requirements for the inputted equipment are then determined at block 115. These testing requirements define how the created validation protocols are to be executed in an effort to test the equipment and/or processes. Using the equipment and/or process specifications, the set-up data, and the testing requirements, draft IQ/OQ test plans 121 are prepared at block 120. The draft IQ/OQ plans 121 are then revised by third parties at block 125 to prepare revised IQ/OQ test plans 123. As part of this review, the draft plans 121 are scrutinized by responsible project team personnel (e.g. quality assurance personnel, participating engineers, etc.) to ensure that the draft plans are accurate, thorough, and mistake-free. Unfortunately, however, the consequences of decentralized data storage are once again realized when practicing step 125. Validation data integrity is risked as validation data is being exposed to additional parties that are in a position to introduce errors.

The revised test plans 123 are then checked by validation personnel (e.g. validation engineers) where they incorporate all of the changes provided by the various contributing parties at block 130 to create a final test plan 131. Having the final plan 131 in hand, validation personnel proceed to execute the test plan at block 135 on specified equipment and processes to ensure that the equipment and/or processes satisfy set regulatory agency requirements, rules, and standards (e.g. Food and Drug Administration validation rules and regulations). The results 137 of the physical testing are then manually aggregated, processed, and formatted at block 140 to create a final IQ/OQ protocol report 141. The final report 141 is then distributed to contracting clients by validation personnel to convey the results of the protocol testing to product manufacturers at block 140. In addition, validation personnel store the final report for future use (e.g. a FDA audit) at block 145.

As can be seen, current validation processes are extremely inefficient requiring a number of steps to ensure accurateness and, more importantly, requiring significant expenditure of resources in the form of human capital (e.g. validation personnel, QA personnel, engineers, etc.) and time (e.g. time to create the validation protocol, time to execute the validation protocol, and time to report the results). Moreover, the decentralized nature of existing practices lends to occurrence of errors throughout the validation life-cycle-errors that would only require additional resources to correct.

The systems and methods described herein aim to ameliorate the shortcomings of current validation practices by providing comprehensive systems and methods that allow for the automated creation, management, tracking, and centralized storage of validation protocols and the automated and/or computerized management of the workflow surrounding the validation life-cycle.

Illustrative Computing Environment

Figure 2:
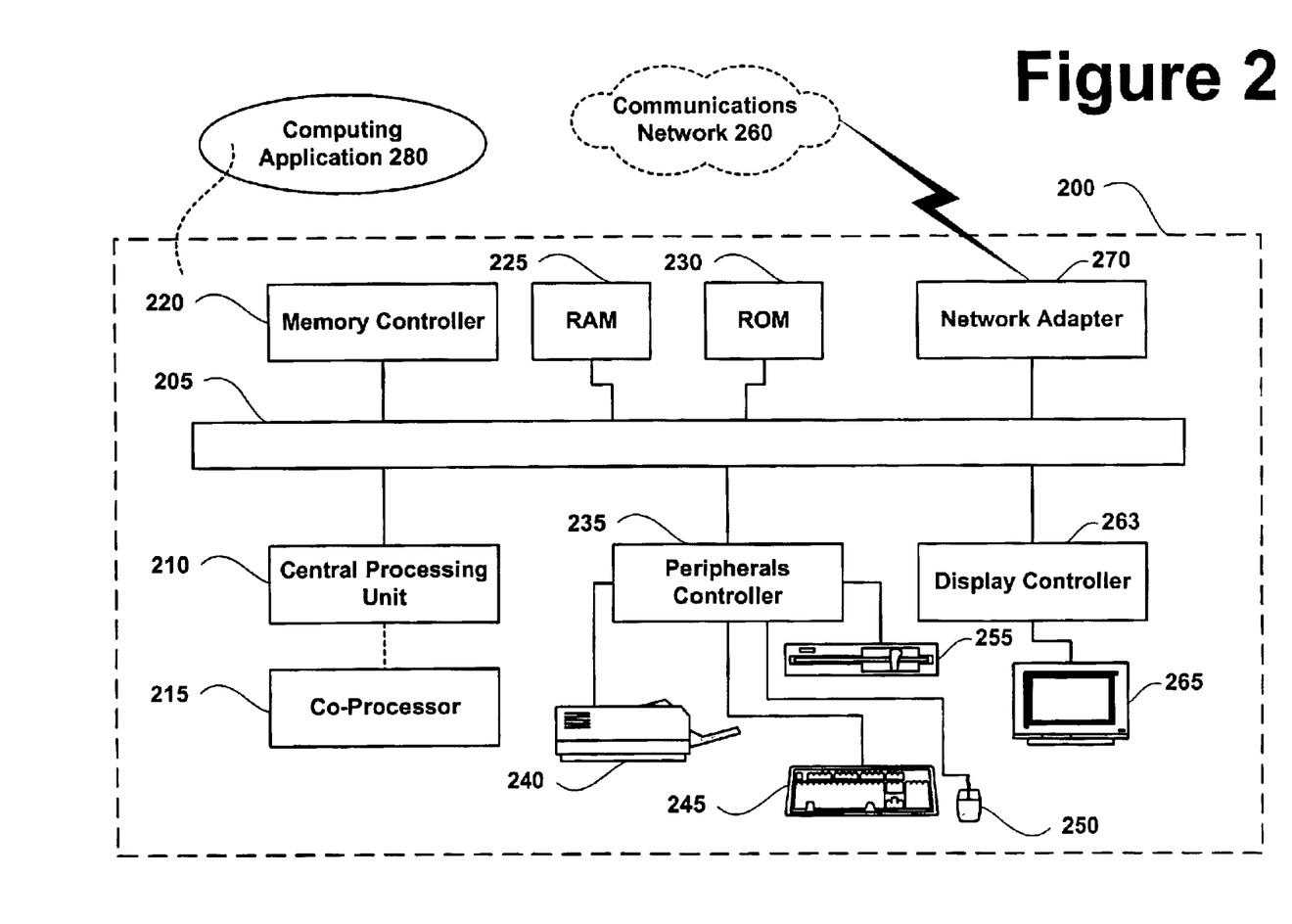
FIG. 2 is a system diagram of an exemplary computing environment.

FIG. 2 depicts an exemplary computing system 200 in accordance with the invention. Computing system 200 is capable of executing an exemplary validation processing and workflow management computing application 205 that allows participating users to perform validation processes electronically. Exemplary validation processing and workflow management computing system 200 is controlled primarily by computer readable instructions, which may be in the form of software, wherever, or by whatever means such software is stored or accessed. Such software may be executed within central processing unit (CPU) 210 to cause computing system 200 to do work. In many known workstations and personal computers central processing unit 210 is implemented by a single-chip CPU called a microprocessor. Coprocessor 215 is an optional processor, distinct from main CPU 210 that performs additional functions or assists CPU 210. One common type of coprocessor is the floating-point coprocessor, also called a numeric or math coprocessor, that is designed to perform numeric calculations faster and better than general-purpose CPU 210. Recently, however, the functions of many coprocessors have been incorporated into more powerful single-chip microprocessors.

In operation, CPU 210 fetches, decodes, and executes instructions, and transfers information to and from other resources via the computer's main data-transfer path, system bus 205. Such a system bus connects the components in computing system 200 and defines the medium for data exchange. System bus 205 typically includes data lines for sending data, address lines for sending addresses, and control lines for sending interrupts and for operating the system bus. An example of such a system bus 205 is the PCI (Peripheral Component Interconnect) bus. Some of today's advanced busses provide a function called bus arbitration that regulates access to the bus by extension cards, controllers, and CPU 210. Devices that attach to these buses and arbitrate to take over the bus are called bus masters. Bus masters support also allows multiprocessor configurations of the buses to be created by the addition of bus master adapters containing a processor and its support chips.

Memory devices coupled to system bus 105 include random access memory (RAM) 225 and read only memory (ROM) 230. Such memories include circuitry that allows information to be stored and retrieved. ROMs 230 generally contain stored data that cannot be modified. Data stored in RAM 225 can be read or changed by CPU 210 or other hardware devices. Access to RAM 225 and/or ROM 230 may be controlled by memory controller 220. Memory controller 220 may provide an address translation function that translates virtual addresses into physical addresses as instructions are executed. Memory controller 220 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 200 may contain peripherals controller 235 responsible for communicating instructions from CPU 210 to peripherals, such as, printer 240, keyboard 245, mouse 250, and disk drive 255.

Display 265, which is controlled by display controller 263, is used to display visual output generated by computing system 200. Such visual output may include text, graphics, animated graphics, and video. Display 265 may be implemented with a CRT-based video display, an LCD-based flat-panel display, gas plasma-based flat-panel display, or a touch-panel. Display controller 263 includes electronic components required to generate a video signal that is sent to display 265.

Illustrative computing environment 200 is capable of executing computer readable instructions in the form of an exemplary computing application 280 to realize desired functions and operations. Exemplary computing application may include but is not limited to network-based computing application, distributed computing application, stand alone computing application, mobile device computing application, and their equivalents.

Further, computing system 200 may contain network adaptor 270 that may be used to connect computing system 200 to an external communications network 260. Communications network 260 may provide computer users with means of communicating and transferring software and information electronically. Communications network 260 also may include but is not necessarily limited to fixed-wire local area networks (LANs), wireless LANs, fixed wire wide-area-networks (WANs), wireless WANs, fixed wire extranets, wireless extranets, fixed-wire intranets, wireless intranets, fixed wire and wireless peer-to-peer networks, fixed wire and wireless virtual private networks, the Internet, and the wireless Internet. Additionally, communications network 260 may provide distributed processing, which involves several computers and the sharing of workloads or cooperative efforts in performing a task. It will be appreciated that the network connections shown are exemplary and that other means of establishing a communications link between the computers may be used.

Illustrative Computer Network Environment

Figure 3:
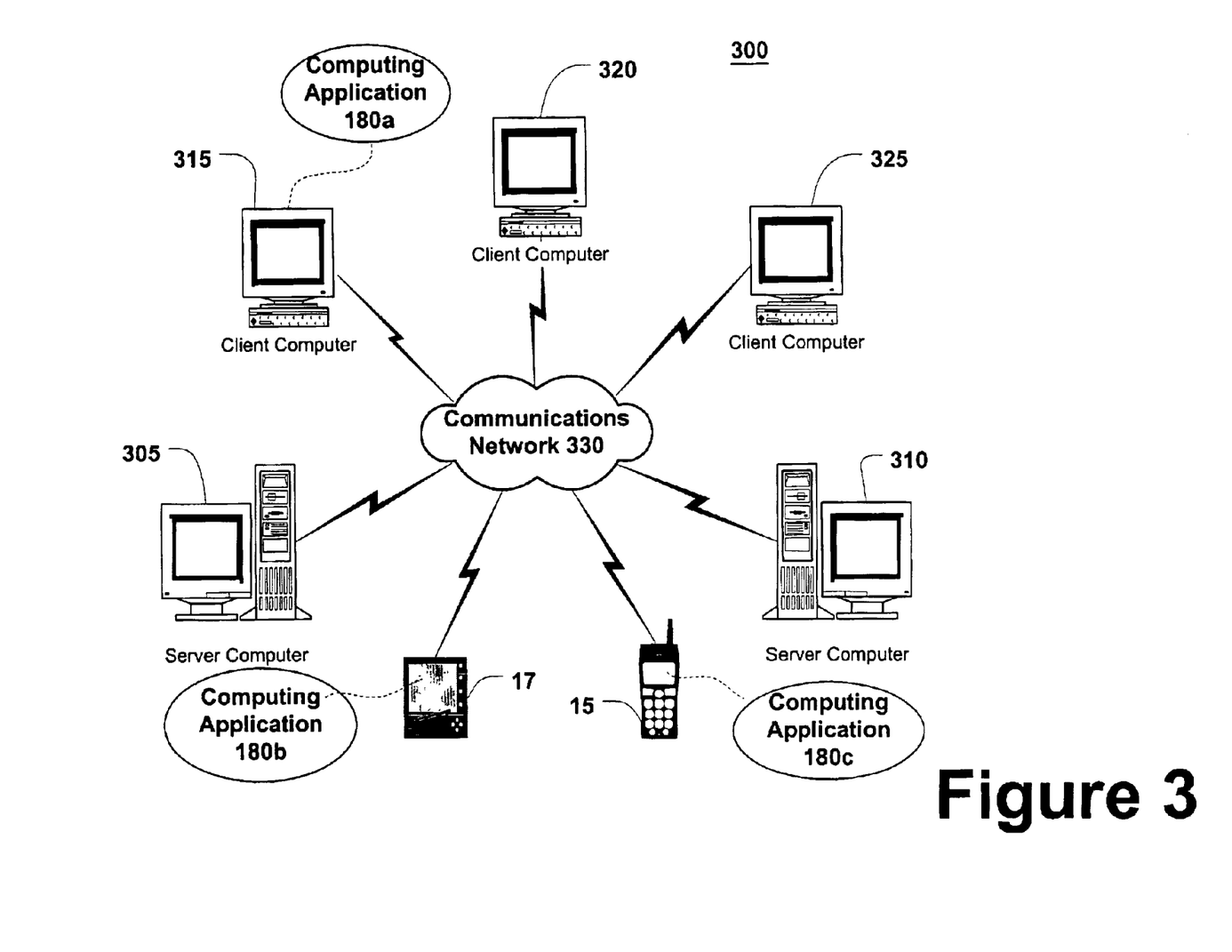
FIG. 3 is a system diagram of a an exemplary networked computing environment.

As noted above, the computer described with respect to FIG. 2 can be deployed as part of a computer network. In general, the above description applies to both server computers and client computers deployed in a network environment. FIG. 3 illustrates an exemplary network environment 300, with a server computers 305, 310 in communication with client computers 315, 320, 325 via a communications network 330, in which the systems and methods described herein may be employed. As shown in FIG. 3, a number of servers 305, 310, etc., are interconnected via a communications network 330 (which may be either a fixed-wire or wireless LAN, WAN, intranet, extranet, peer-to-peer network, or the Internet) with a number of client computers 315, 320, 325, or computing devices, such as, mobile phone 15 and personal digital assistant 17. In a network environment in which the communications network 330 is the Internet, for example, the servers 305 and 310 can be Web servers with which the client computing devices 315, 320, 325, 15 or 17 communicate via any of a number of known protocols, such as, hypertext transfer protocol (HTTP) or wireless application protocol (WAP), as well as other innovative communication protocols. Each client computer 315, 320, and 325 can be equipped with computing application 180a to gain access to the servers 305 and 310. Similarly, personal digital assistant 17 can be equipped with computing application 180b and mobile phone 15 can be equipped with computing application 180c to display and receive various data. Further, server computers 305 and 310 may interact with one or more data stores (not shown) to store and retrieve data.

The systems and methods described herein can be utilized in a computer network environment having client computing devices for accessing and interacting with the network and a server computer for interacting with client computers. However, the systems and methods for providing automated validation processing and workflow management of the present invention can be implemented with a variety of network-based architectures, and thus should not be limited to the example shown. The systems and methods described herein are now described in more detail with reference to the provided illustrative implementation.

Automated Validation Processing and Workflow Management

Figure 4:
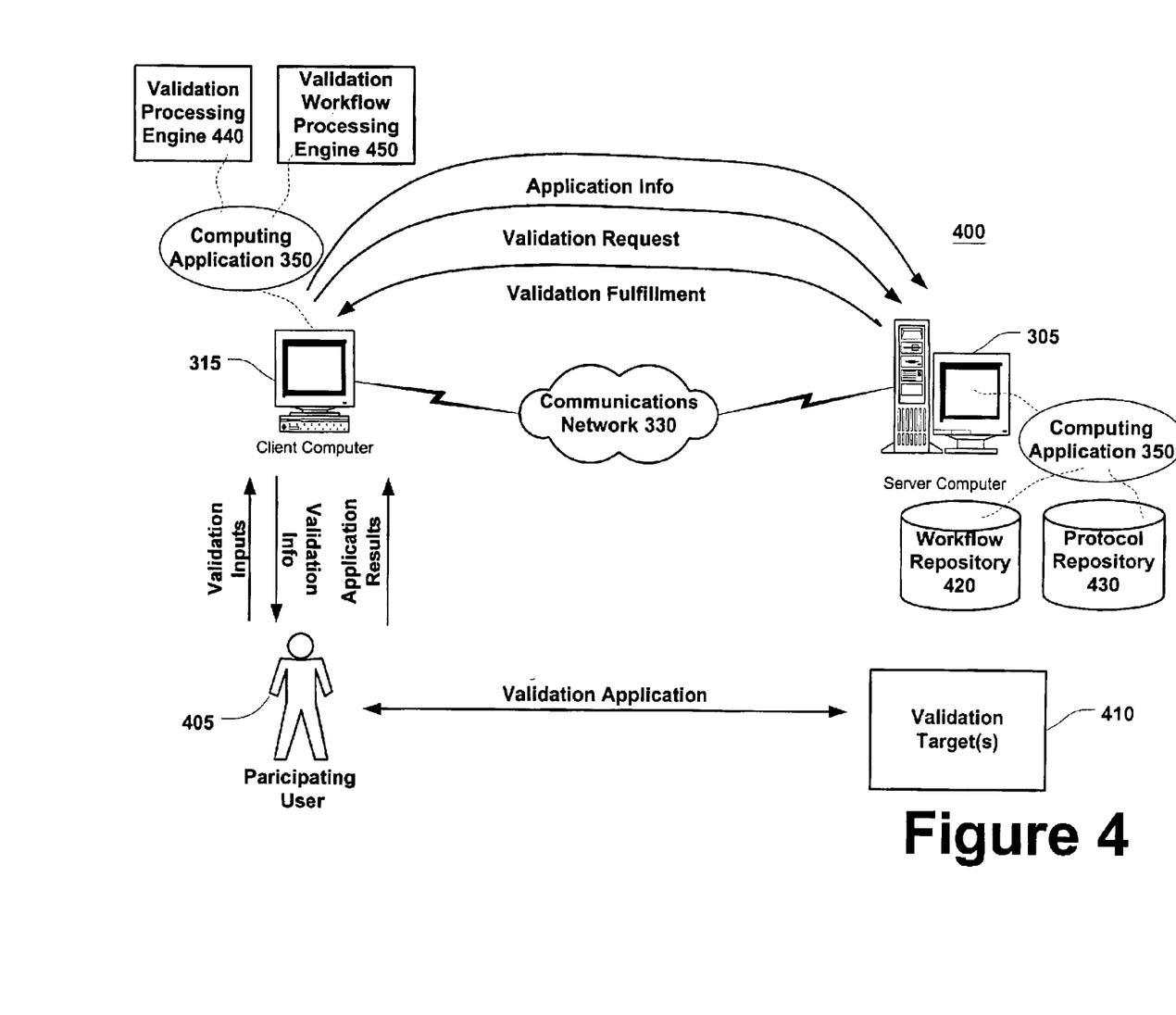
FIG. 4 is a block diagram showing the interaction between exemplary components of the automated validation processing and workflow management system.

FIG. 4 shows the interaction of cooperating components of an exemplary validation processing and workflow management system. As shown (and with reference to FIG. 3), validation processing and workflow management system 400 comprises client computer 315 that communicates data to and from server computer 305 over communications network 330. Operating between client computer 315 and server computer 305 is exemplary computing application 350. In operation, participating users 405 interact (as shown by the arrows) with client computer 315 through some user interface (not shown) to input and retrieve data indicative of validation processes. In a contemplated implementation, computing application 350 may offer one or more graphical interfaces having one or more dialog boxes that prompt participating users to input data representative of protocols desired to be generated and/or retrieved. In this implementation, participating users may be prompted to choose options from at least one pull down menu, where the options describe one or more details required to generate the desired validation protocol. The option input data is gathered by exemplary computing application and communicated to computer server 305 over communications network 330.

In turn computing application 350, partially operating on computer server 305, processes the inputted data to generate at least one validation protocol. When generating the validation protocol, computing application 250 relies on validation processing rules contained in validation processing engine 440. These rules may include the execution of one or more conditional checks to arrive at the appropriate protocol that is to be generated. Generated protocols are stored in validation repository 430 and communicated back to client computer 315 for display to participating users 405. Participating users may view, manipulate, and print generated protocols. Furthermore, the present invention allows for the tracking and management of protocol execution in the field. As shown in FIG. 4, once the desired protocol is delivered to participating user 405, participating user 405 may then execute the protocol on validation targets 410. The results of the protocol execution may then be provided to computing application 350 by participating user 405 through inputs on client computer 315. The protocol execution results may then be stored by computing application 350 in workflow repository 420. Protocol execution results may then be used when performing workflow processing to ensure that validation life cycle portions are completed and reviewed in compliance with validation regulations and guidelines.

A similar data flow occurs when computing application 350 performs workflow management for validation processing. Participating users 405 input data representative of workflow management (e.g. a request to view, manipulate, or update an existing workflow management plan for on or more generated and/or stored validation protocols) to computer application 350. The workflow data is communicated to computer server 305 over communications network 330 for processing by computing application 350 on computer server 305. When processing workflow data computing application relies on set of workflow processing rules as contained in validation workflow processing engine 440. The workflow processing rules may require the execution of one more conditional checks to track, manage, update, and store validation workflow management plans and associated information, including managing user rights. In validation processing, workflow management requires a significant expenditure of time and resources to ensure that created validation protocols are reviewed by the necessary personnel, and more importantly, are executed in a timely manner with care and attention. The validation processing workflow management feature of the present invention provides a computing based alternative to these arduous tasks.

Furthermore, the present invention contemplates the assignment of user rights to participating users. These user rights would restrict access to any of the following including but not limited to validation protocol data, workflow management data, validation protocol creation/customization features (e.g. the ability to create a new validation protocol for use across an enterprise), workflow management features (e.g. the ability to deem a task complete to finalize one or more portions of the validation life cycle). In restricting user access, workflow management may better implemented to ensure the completion of set tasks (e.g. the testing of a validation protocol, the review of a validation protocol, the acceptance of a validation protocol, etc.) and to better track the overall validation life cycle across an enterprise and through the duration of a contemplated project. Stated differently, the present invention provides centralized data management of what was once disjoined validation and validation workflow data. In a contemplated enterprise (e.g. company or business), various participating users ranging from project engineers to enterprise executives to outsourced validation personnel will have access to the present invention. In providing user access rights, a number of personnel from differing departments and/or collaborating enterprises may participate in data sharing and collaboration (real-time or delayed) to execute and realize one or more portions of the validation life cycle. Furthermore, the implementation of user rights ensures data integrity as only a select number of decision personnel will be provided the gamete of editorial abilities, i.e. review, modification, and update abilities. The use of user rights also allows for the optimization of participating resources from a workflow management context as redundancy in process execution can be eliminated.

It is understood that although a particular implementation is illustrated in FIG. 4 for the deployment of computing application in a networked computer environment that this implementation is merely illustrative and does not limit the inventive concepts described herein. Rather, the present invention contemplates the deployment of exemplary computing application 350 in various configurations and arrangements such that one or more of the described components (e.g. validation repository 420, workflow repository 430) of exemplary computing application may reside on client computer 315 and/or server computer 305 and/or vice-versa. Furthermore, the present invention may be deployed as an integrated feature of a computer assisted design (CAD) platform. In this context, the present invention would cooperate with one or more components of the CAD platform through a translation language (HTML, DHTML, XML, etc.) to share data and to realize validation processing and/or validation workflow management processing operations.

Figure 5:
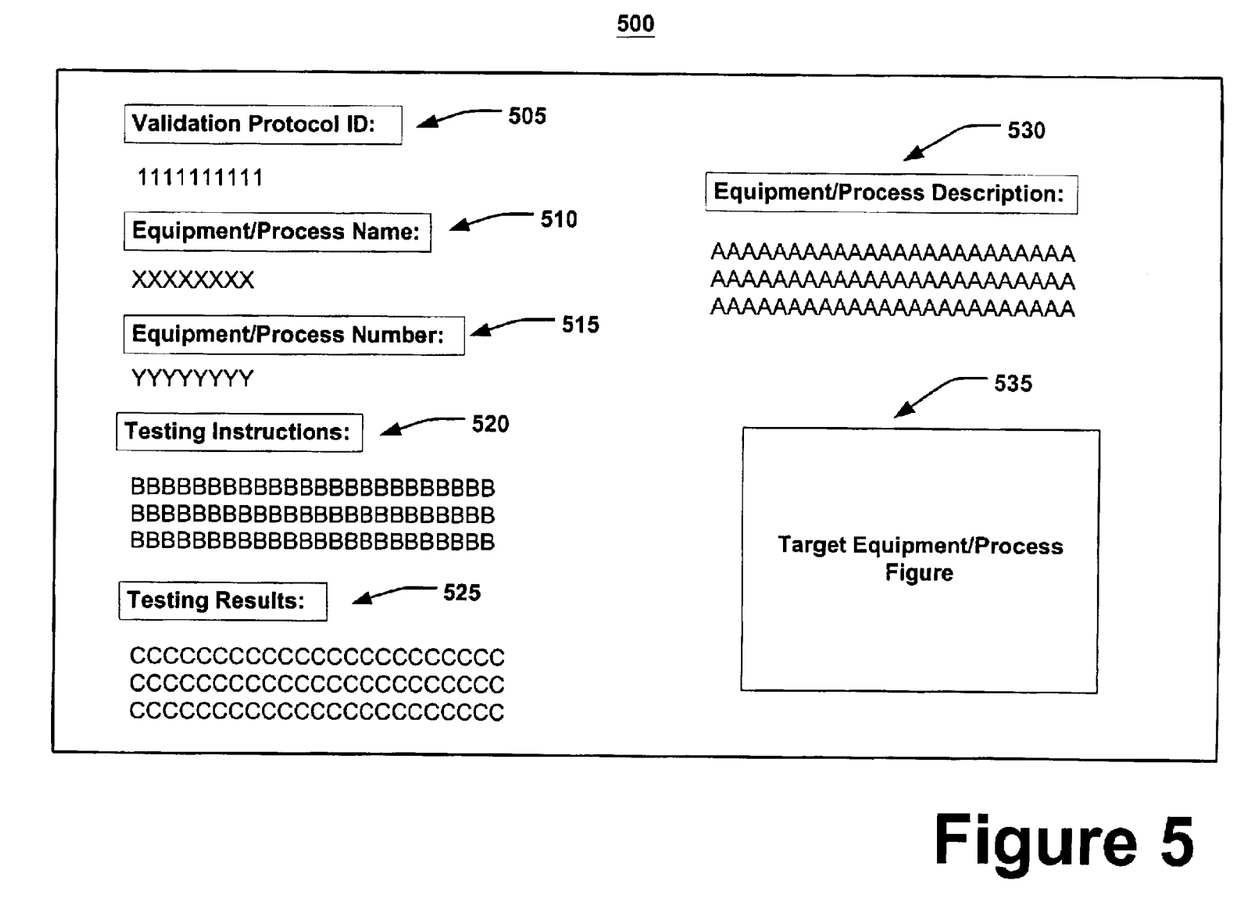
FIG. 5 a block diagram of an exemplary validation template that may be created, stored, and managed by the automated validation processing and workflow management system.

FIG. 5 shows an exemplary validation protocol template that may be created by the herein described systems and methods in response to participating user inputs. As shown, exemplary validation protocol template 500 comprises various descriptors and corresponding descriptor content. Specifically, in the example provided, exemplary validation protocol template 500 comprises Validation Protocol ID 505, Equipment/Process Name 510, Equipment/Process Number 515, Equipment/Process Description 530, Testing Instructions 520, Testing Results Area 525, and Target Equipment/Process Figure 535. In operation, these descriptors of the exemplary validation protocol template 500 are populated with content such to provide a complete validation protocol.

Specifically, responsive to user input, the systems and methods described herein process the user input to generate content to populate exemplary validation protocol template 500. For example, if a participating user wishes to perform validation on an autoclave, the participating provides data representative of desire to perform validation for an autoclave. In response, the present invention aggregates content to populate the exemplary validation protocol template so to dynamically create a validation protocol for an autoclave (alternatively, the present invention may also retrieve an already created validation protocol for an autoclave). The final validation protocol template may have the Validation Protocol ID 505 descriptor populated with "AUTOCLAVE-01". The Equipment/Process Name 510 descriptor may be populated with "AUTOCLAVE" and the Equipment/Process Number 510 descriptor populated with "A-1". The Equipment/Process Description 530 descriptor may be populated with "Autoclave—Serial Number: XXXX, Model Number: YYYY, For use in solid dosage manufacturing". Testing Instructions 520 descriptor may be populated with instructions in compliance with validation regulations and rules regarding how to validate an autoclave. The Target Equipment/Process figure area 535 may be populated with one or more pictures of the autoclave desired to be validated. In operation, this figure may be provided by the user or retrieved from a library of figures (e.g. pictures) of commonly validated validation targets. Lastly, the Testing Results descriptor may be populated by data offered by participating users indicative of results observed from protocol execution on intended validation targets. In the case of the autoclave, the Testing Results 525 descriptor would be populated with data indicative of results observed from the execution of the validation protocol Testing Instructions 520 content.

It is understood that exemplary validation protocol template 500 having exemplary descriptors and exemplary descriptor content is offered for illustrative purposes only and does not limit the scope of the inventive concepts herein. Rather, the present invention contemplates the use of various predefined, dynamically generated, and customizable validation protocol templates employing various validation protocol descriptors.

Figure 6:
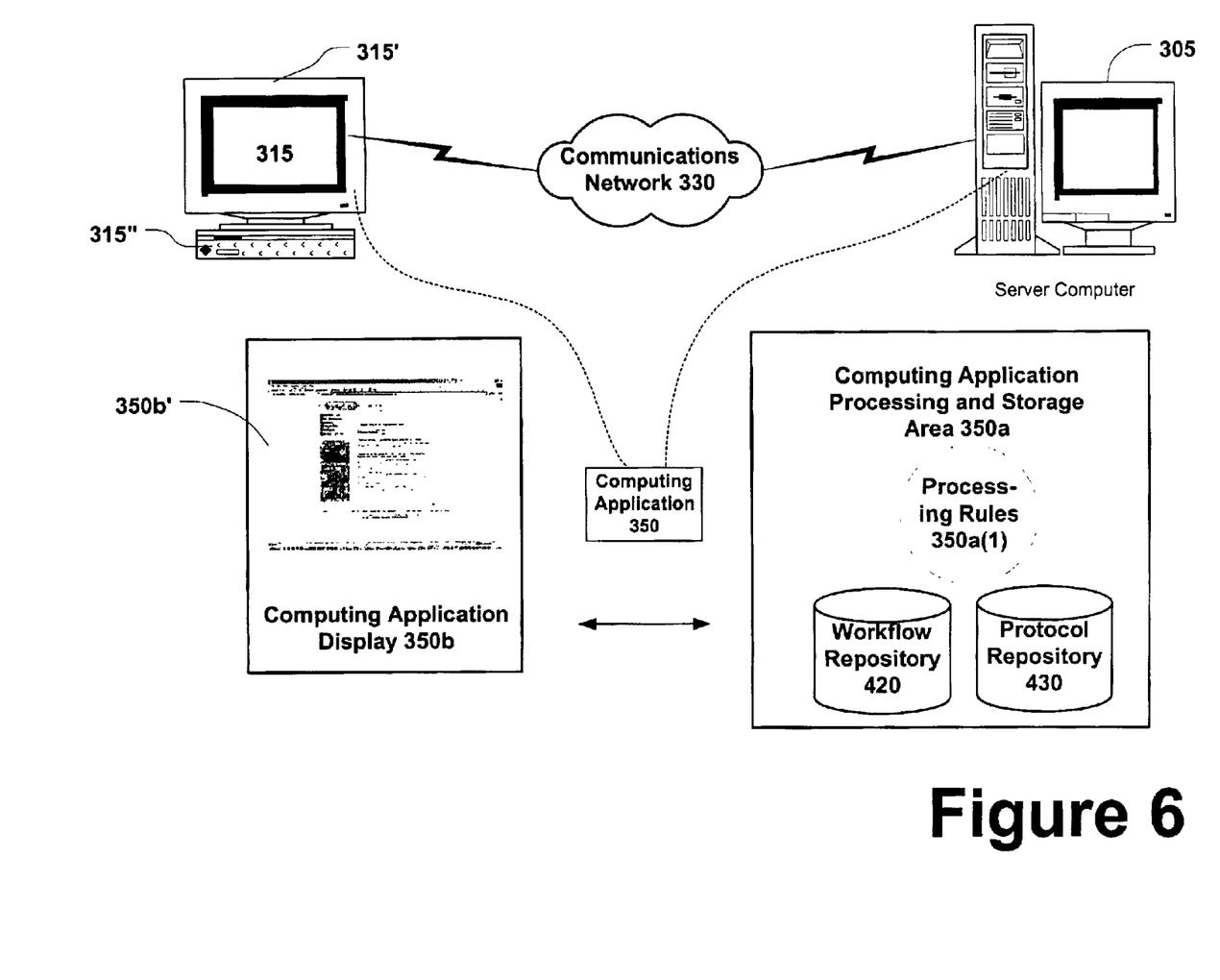
FIG. 6 is a block diagram showing the cooperation of various components of an exemplary computing application performing automated validation.

FIG. 6 shows the interaction of the various components of exemplary computing application that performs automated validation processing and engages in validation workflow management. As shown, computer 315 may comprise display device 315' and interface and processing unit 315". Computer 315 in conjunction with computer server 305 may support exemplary computing application 350. As shown, computing application 180 may comprise computing application processing and storage area 350*a* and computing application display 350*b*. Computing application processing and storage area 350*a* may contain processing rules 350*a*(1), workflow repository 420, and protocol repository 430. Similarly, computing application display 350*b* may comprise display content 350*b*'. In operation, a participating user (not shown) may interface with computing application 350 through the use of computer 315. The participating user (not shown) may navigate through computing application 350 to create, track, manage, and store validation processing nad validation workflow management information. Validation processing and validation workflow management may be realized by computing application 350 using processing rules 350*a*(1) workflow repository 420, and protocol repository 430 of computing application processing and storage area 350*a* and displayed to a participating user (not shown) as display content 350*b*' on computing application display 350*b*. The components of exemplary computing application 350 cooperate in the manner described above when performing automated validation processing and validation workflow management.

Figure 7:
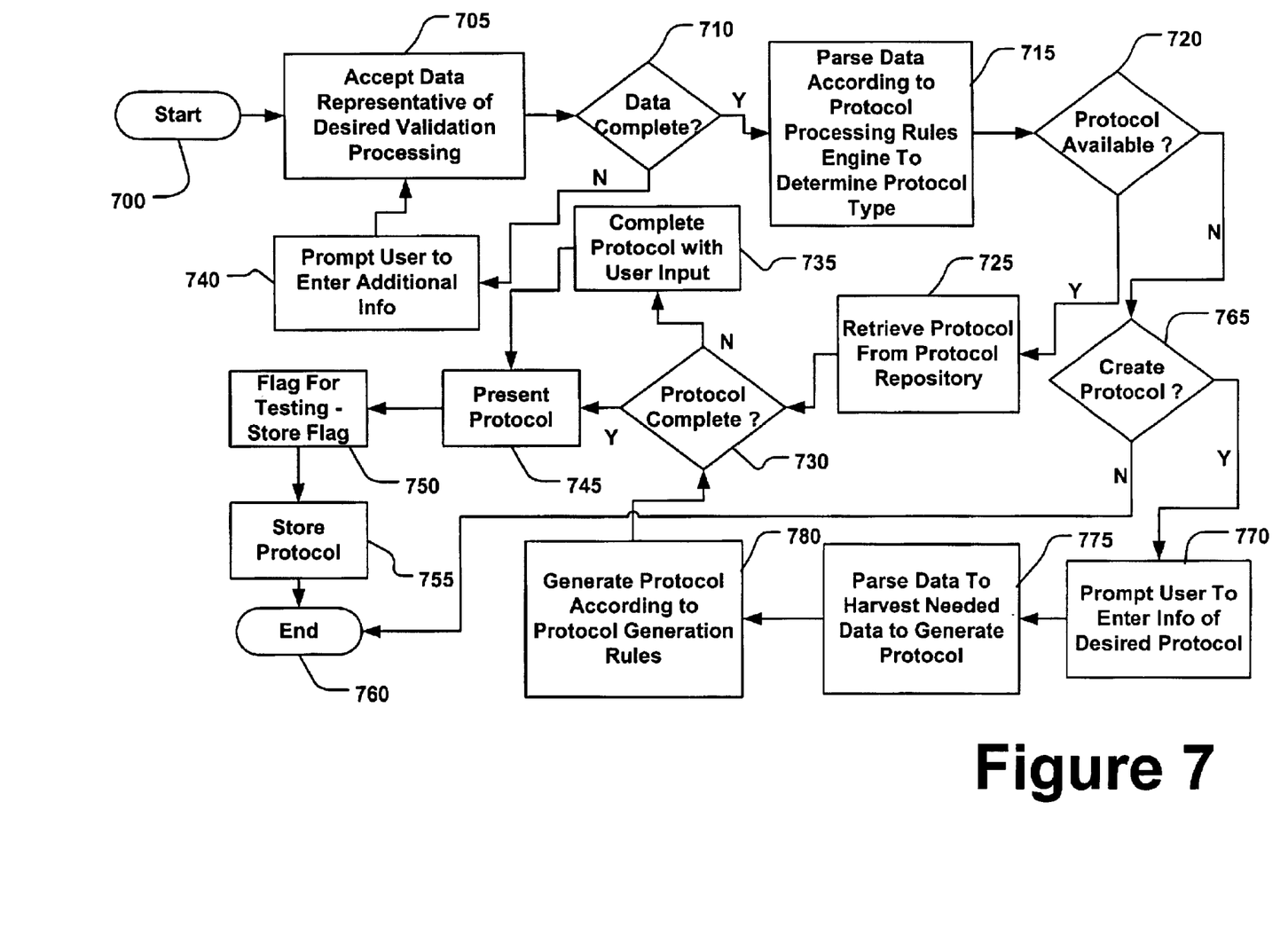
FIG. 7 is a screen shot of an exemplary user interface used to retrieve and display data representative of validation processing and validation workflow management.

FIG. 7 shows the processing performed when performing automated validation processing. As shown processing begins at block 700 and proceeds to block 705 where data representative of desired validation processing is accepted. From there a check is performed at block 710 to ensure that the least amount of information necessary to generate (and/or retrieve) a validation protocol has been provided. If additional information is needed, processing proceeds to block 740 where participating users are prompted to enter additional information. Processing reverts to block 705 and proceeds there from. However, if at block 710 it is determined that the necessary data has been provided, processing proceeds to block 715 where the accepted data is parsed according to protocol processing rules engine to determine the type of protocol that will be generated and/or retrieved. A check is then performed at block 720 to determine if a generalized protocol (e.g. a protocol for a 100 mm graduated cylinder) would suffice or if a custom protocol will be needed. If a generalized protocol is sufficient, processing proceeds to block 725 where the generalized protocol is retrieved from a protocol repository. A check is then performed at block 730 to determine if the protocol is complete (i.e. if the participating user would like to add comments and/or modify the protocol for a specific need). If the protocol is complete, the protocol is presented to the user at block 745. The protocol is then flagged for testing in compliance with validation workflow management principles at block 750 and stored for future reference in a workflow repository at block 755. Processing then terminates at block 760.

However, if it is determined at block 730 that the generalized protocol is not complete (i.e. participating users require the addition of commentary and/or modifications), processing proceeds to block 735 where the participating user completes the generalized protocol. From there processing goes to block 745 and proceeds there from. Further, if it is determined at block 720 that a generalized protocol is insufficient, processing proceeds to block 765 where a check is performed to determine if a custom protocol is to be generated. If it is not, processing terminates at block 760. However, if a custom validation protocol (e.g. a validation protocol for a custom designed and built centerfuge) is to be generated, processing proceeds to block 770 where the user is prompted to entire information relating to the desired protocol (this type of information may be more detailed than the general information accepted at block 705). From there, processing proceeds to block 775 where the custom protocol information is parsed to harvest the necessary data required to generate the custom validation protocol. The custom protocol is then generated according to protocol generation rules of the protocol processing rules engine. From there processing jumps to block 730 and proceeds there from.

Figure 8:
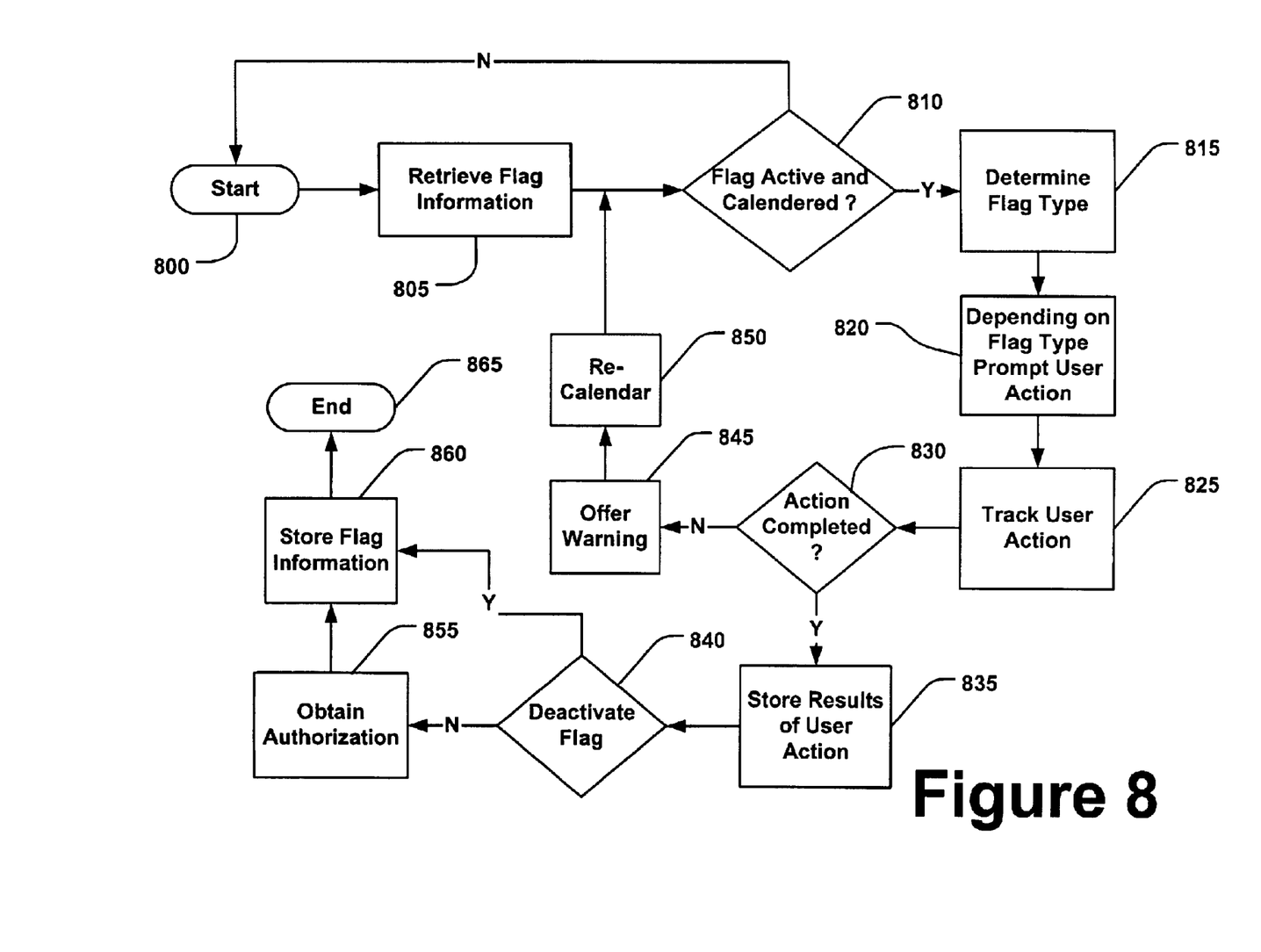
FIG. 8 is a flow diagram of the processing performed when performing automated validation processing.

FIG. 8 shows the processing performed realize validation workflow management. As shown, processing begins at block 800 and proceeds to block 805 where flag information is retrieved. A check is then performed at block 810 to determine if the flag is active and calendared. If the flag is not active, processing reverts to block 800. However, if the flag is active and properly calendared, processing proceeds to block 815 where the flag type is determined. From there, at block 820 the workflow management processing prompts user action(s) depending on the flag type. The user action is then tracked at block 825. A check is then performed at block 830 to determine if the prompted action(s) has (have) been completed. If the prompted action(s) have been completed, processing proceeds to block 835 where the results of the user action(s) are stored. A check is then performed at block 840 to determine whether to deactivate the flag. If it is to be deactivated processing proceeds to block 860 where the flag information is stored. From there processing terminates at block 865. However, if the flag is not to be deactivated at block 840, processing proceeds to block 855 where authorization is obtained to deactivate the flag. This authorization may be provided by a participating user having administrative rights. From there processing jumps to block 860 and proceeds there from.

However, if at block 830 it is determined that the prompted user action(s) have not been completed, processing proceeds to block 845 where a warning is offered to the participating user. The flag is then re-calendared at block 850 and processing reverts to block 810.

Figure 9:
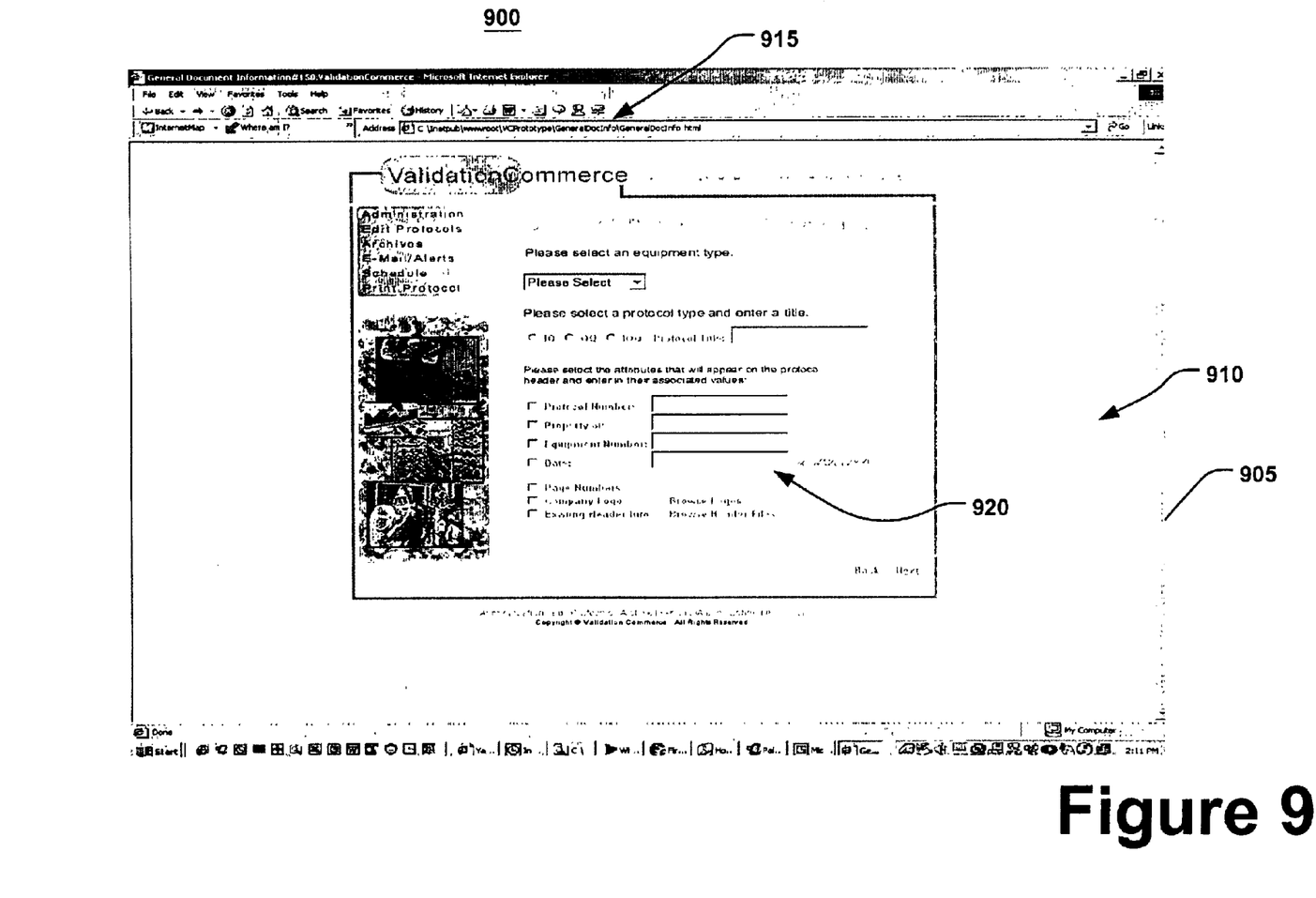
FIG. 9 is a flow diagram of the processing performed to realize validation workflow management.

FIG. 9 shows a screenshot of an exemplary user interface used to retrieve and display data representative of validation processing and validation workflow management. As shown exemplary user interface 900 comprises display and input pane 905 having navigation controls 915 used to navigate for display and input content 910. In the exemplary user interface provided, content 910 may comprise at least one dialog box 920 operable to receive input from participating users representative of validation processing and/or validation workflow management data. The accepted data may then be communicated by the user interface to an underlying validation processing and validation workflow management computing application (not shown) that may process the accepted data to generate and/or retrieve additional data for display on the user interface display and input pane 910.

CONCLUSION

In sum, the systems and methods described herein allow for the automation of validation processes and validation workflow management when performing validation. It is understood, however, that the systems and methods described herein are susceptible to various modifications and alternative constructions. There is no intention to limit the systems and methods described herein to the specific constructions described herein. On the contrary, the systems and methods described herein are intended to cover all modifications, alternative constructions, and equivalents falling within the scope and spirit of the systems and methods described herein.

It should also be noted that the systems and methods described herein may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the systems and methods described herein has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The systems and methods described herein may be better defined by the following exemplary claims.

What is claimed is:

1. A system providing automated validation processing and validation workflow management comprising:
   a user interface, said user interface having at least one dialog box populated with a plurality of validation processing information and/or validation workflow management information and operable to allow the selection of at least one of said validation processing information and/or validation workflow processing data; and
   a validation processing engine cooperating with said user interface, said validation processing engine maintaining at least one validation processing rule to operate on selected validation processing data to generate validation protocol data.

2. The system as recited in claim 1, further comprising a validation workflow management engine, said validation workflow management engine operating on selected validation workflow management information to generate workflow work-products for use in validation processing.

3. The system as recited in claim 2, wherein said validation workflow management engine comprises at least one validation workflow management rule that operates on said selected validation workflow management information to generate said workflow work-products used in validation processing.

4. The system as recited in claim 3, wherein said workflow work-products comprise any of: status information of validation testing, calendaring information for outstanding executions of validation protocols, flag information for outstanding executions of validation protocols, status information for validation projects in total, status information for portions of validation projects, account information about participating users, credential information about participating users, user rights information, user rights information, user rights controls and scheduling information about validation projects.

5. The system as recited in claim 2, wherein said validation processing engine and said validation workflow management engine comprise a computing application.

6. The system as recited in claim 5, wherein said computing application operates in an environment comprising any of a stand-alone computing environment and a networked computing environment.

7. The system as recited in claim 6, wherein said computing application operates between at least one client computer and at least one server computer that communicate together over a communications network, said communications network comprising any of a fixed wire local area network, a wireless local area network, a fixed wire wide area network, a wireless wide area network, a fixed wire intranet, a wireless intranet, a fixed wire extranet, a wireless extranet, a fixed wire peer-to-peer network, a wireless peer-to-peer network, a wireless Internet, and Internet.

8. The system as recited in claim 7, wherein said computing application operates as at least one feature of a computer assisted design (CAD) computing platform.

9. The system as recited in claim 7, wherein said computing application operates as part of an application service provider (ASP) business model.

10. The system as recited in claim 1, further comprising at least one data store, said data store capable of storing any of said validation processing data, said validation workflow management data, and said validation protocol data.

11. In a computing environment a method to automate the validation of equipment and/or processes for use in a pharmaceutical and/or bio-technology manufacturing facility comprising the steps of:
   providing a user interface capable of accepting and/or displaying data representative of validation processing and/or validation workflow management information, wherein said user interface has at least one dialog box populated with validation processing and/or validation workflow management information;
   providing a validation processing engine, said validation processing engine comprising at least one processing rule that operates on validation processing information selected through said user interface to produce validation protocol information.

12. The method as recited in claim 11, further comprising providing a validation workflow processing engine, said validation processing workflow engine comprising at least one processing rule that operates on validation workflow management selected through said user interface to produce validation workflow management work-product, wherein said validation workflow management work-product comprises any of: status information of validation testing, calendaring information for outstanding executions of validation protocols, flag information for outstanding executions of validation protocols, status information for validation projects in total, status information for portions of validation projects, account information about participating users, credential information about participating users, user rights information, and user rights information, user rights controls, scheduling information about validation projects.

13. The method as recited in claim 12, further comprising the step of providing a data store, said data store capable of storing information representative of comprising any of validation processing information, validation protocol information, validation workflow management information, and validation workflow management work-product information.

14. A computer readable medium comprising computer readable instructions to perform the steps as recited in claim 12.

15. A system to automate validation of equipment and/or processes for use in a pharmaceutical and/or biotechnology manufacturing facility comprising:
a computing application, said computing application comprising:
a user interface capable of accepting and/or displaying validation processing information,
wherein said user interface maintaining at least one dialog box populated with selectable validation processing information,
a validation processing engine, said validation processing engine comprising at least one processing rule operating on validation processing information to generate at least one validation protocol; and
a data store, said data store cooperating with said computing application to store data representative of validation processing information and validation protocol information.

16. The system as recited in claim 15, wherein said computing application operates between at least one client computer and one server computer cooperating over a communications network.

17. The system as recited in claim 16, wherein said communications network comprises any of a fixed wire local area network, a wireless local area network, a fixed wire wide area network, a wireless wide area network, a fixed wire intranet, a wireless intranet, a fixed wire extranet, a wireless extranet, a fixed wire peer-to-peer network, a wireless peer-to-peer network, wireless Internet, and Internet.

18. The system as recited in claim 15, wherein said computing application operates on a stand-alone personal computer.

19. The system as recited in claim 15, wherein said computing application operates as a feature of a computer assisted design platform.

20. A system to automate validation of equipment and/or processes facility comprising:
a computing application operating between at least one client computer and one server computer cooperating over a communications network,
wherein said communications network comprises any of a fixed wire local area network, a wireless local area network, a fixed wire wide area network, a wireless wide area network, a fixed wire intranet, a wireless intranet, a fixed wire extranet, a wireless extranet, a fixed wire peer-to-peer network, a wireless peer-to-peer network, wireless Internet, and Internet,
said computing application comprising:
a user interface capable of accepting and/or displaying validation processing information,
wherein said user interface maintaining at least one dialog box populated with selectable validation processing information,
a validation processing engine, said validation processing engine comprising at least one processing rule operating on validation processing information to generate at least one validation protocol; and
a data store, said data store cooperating with said computing application to store data representative of validation processing information and validation protocol information.

21. A system to automate validation of equipment and/or processes facility comprising:
a computing application operating as a feature of a computer assisted design (CAD) platform, said computing application comprising:
a user interface capable of accepting and/or displaying validation processing information,
wherein said user interface maintaining at least one dialog box populated with selectable validation processing information,
a validation processing engine, said validation processing engine comprising at least one processing rule operating on validation processing information to generate at least one validation protocol; and
a data store, said data store cooperating with said computing application to store data representative of validation processing information and validation protocol information.

22. In a computing environment, a method providing automated validation and validation workflow management comprising the steps of:
receiving data representative of equipment and/or process data requiring validation selected through a user interface;
processing said received equipment and/or process validation data by a validation processing engine, said validation processing engine executing at least one validation processing rule;
generating at least validation protocol based on said received equipment and/or process validation data; and
generating validation workflow management work-products, said validation workflow management work-products comprising any of status information of validation testing, calendaring information for outstanding executions of validation protocols, flag information for outstanding executions of validation protocols, status information for validation projects in total, status information for portions of validation projects, account information about participating users, credential information about participating users, user rights information, and user rights information, user rights controls, scheduling information about validation projects.

23. The method as recited in claim 22 further comprising the step of storing generated validation protocol information, and said workflow management work-products in a cooperating data store.

* * * * *